United States Patent [19]

Peting et al.

[11] Patent Number: 5,037,144
[45] Date of Patent: Aug. 6, 1991

[54] RESTRAINED PIPE JOINT

[75] Inventors: Robert G. Peting, Oak Forest; John J. Budziak, Countryside, both of Ill.

[73] Assignee: AMSTED Industries Incorporated, Chicago, Ill.

[21] Appl. No.: 518,426

[22] Filed: May 2, 1990

[51] Int. Cl.5 .............................. F16L 39/00
[52] U.S. Cl. ................................ 285/321; 285/94; 285/184; 285/374; 285/323; 285/308; 29/428
[58] Field of Search ............... 285/374, 321, 94, 322, 285/184, 323, 308; 29/428

[56] References Cited

U.S. PATENT DOCUMENTS

| | | | |
|---|---|---|---|
| 2,538,683 | 1/1951 | Guiler et al. | 285/374 X |
| 4,186,950 | 2/1980 | Billingsley et al. | 285/323 X |
| 4,298,219 | 11/1981 | Amelink | 285/321 X |
| 4,506,919 | 3/1985 | Peting | 285/374 X |
| 4,552,385 | 11/1985 | Peting | 285/374 X |
| 4,712,813 | 12/1987 | Passerell et al. | 285/323 X |
| 4,867,488 | 9/1989 | Jones | 285/374 X |

Primary Examiner—Dave W. Arola
Attorney, Agent, or Firm—Edward J. Brosius; F. S. Gregorczyk

[57] ABSTRACT

A restrained pipe joint is provided for affixing the spigot end of a first pipe into the socket end of a second pipe. The pipe joint includes a circular restraining ring and a retainer ring which includes a groove ring and a plurality of locking segments. When the retaining ring is tightened, the retaining ring is forced against the circular restraining ring, thereby engaging the locking segment teeth into the spigot end of the first pipe. The groove ring abuts the circular restraining ring which holds the spigot end of the first pipe within the socket end of the second pipe.

8 Claims, 5 Drawing Sheets

FIG_1

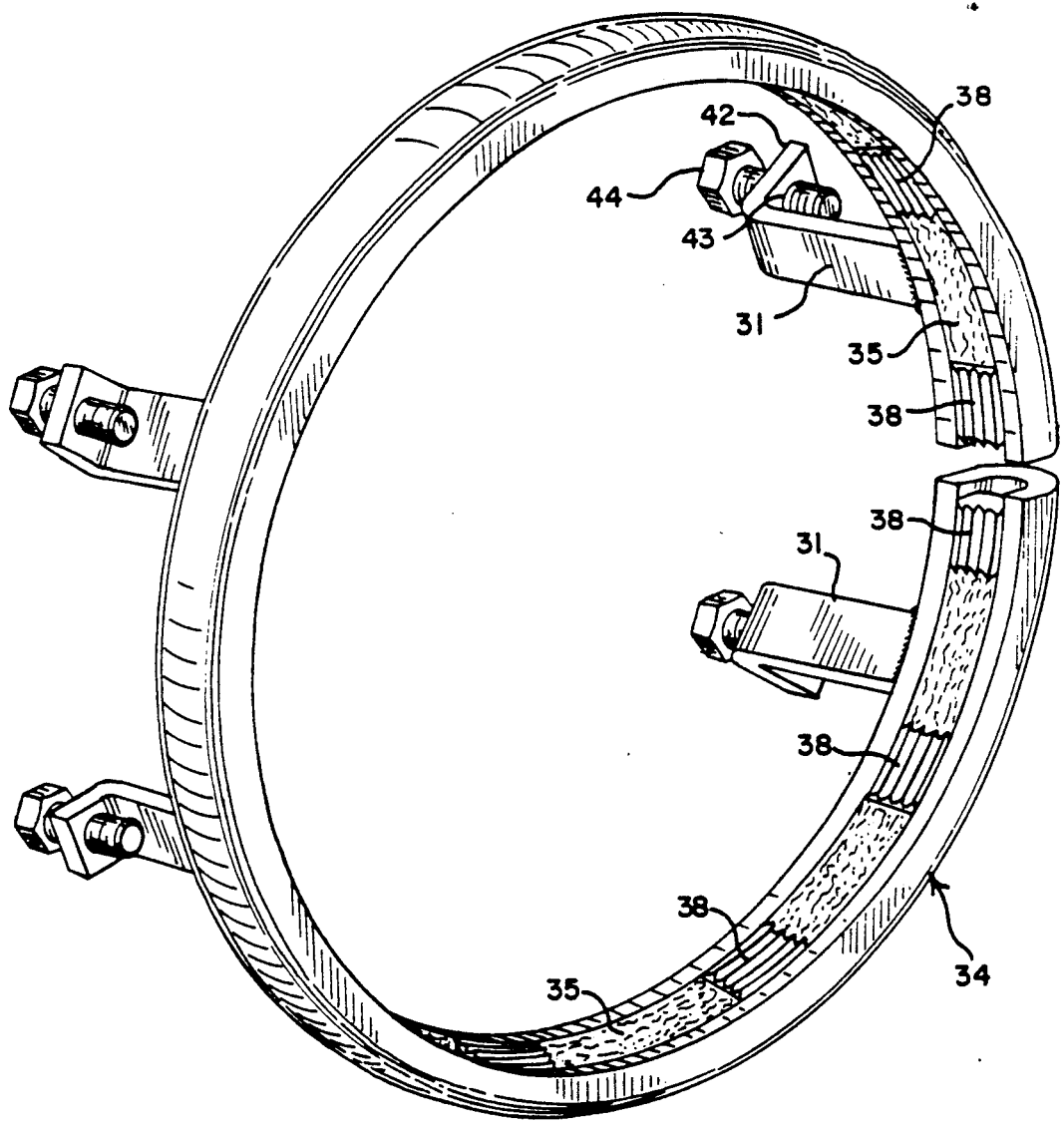

RESTRAINED PIPE JOINT

BACKGROUND OF THE INVENTION

The present invention relates generally to joints for bell or socket and spigot-type pipe couplings and, more particularly, to an improved joint for use in retaining the spigot end of a first pipe within the socket or bell end of a second pipe against the separating forces encountered due to internal fluid pressures in the pipe line.

Various types of restrained mechanical pipe joints are known. A typical mechanical pipe joint is shown in U.S. Pat. No. 4,506,919. The mechanical pipe joint shown in that patent requires that a ring be fixed by welding onto the outer surface of the spigot end of a pipe. The spigot end of such pipe is held by a retainer ring which has a internal sloped surface bearing against the ring welded to the spigot end of the first pipe. The retainer ring itself is held to the flange of the socket end of a second pipe by bolts. Upon the tightening of such bolts, the retainer ring bears against the ring welded to the spigot end of the first pipe thereby pulling the spigot end of the first pipe into the socket end of the second pipe thereby completing the restrained mechanical pipe joint.

A shortcoming of such restrained mechanical pipe joints is that they require a ring to be welded to the outside of the spigot end of a pipe. It is desirable to provide a restrained mechanical pipe joint useful to join the spigot end of a first pipe to the socket end of a second pipe without the need of welding a ring about the spigot end of the first pipe. Frequently, pipe must be cut in the field, and it is desirable to be able to insert such field cut pipe into the socket end of other pipe and form a joint between the two pipes without the need for field welding of a ring onto a pipe end.

SUMMARY OF THE INVENTION

It is an object of the present invention to provide a joint for joining the spigot end of a first pipe to the socket end of a second pipe wherein a retainer ring includes a locking segment capable of bearing against the outer surface of the spigot end of the first pipe.

The present invention provides a push-type pipe joint whereby the spigot end of a first pipe is held within the socket or bell end of a second pipe. In one embodiment of the present invention, a circular restraining ring is held within the socket end of a pipe by a snap ring. The restraining ring has an inclined inner surface which bears against the circular outer surface of a locking segment groove ring of a circular retainer ring. By tightening threaded bolts or similar fasteners into contact with the circular restraining ring, the upper surface of the locking segment groove ring bears against the restraining ring thereby forcing gripping elements into contact with the outer surface of the spigot end of the first pipe. The retainer ring is comprised of a locking segment groove ring holding a plurality of locking segments separated by spacer elements which are generally of an elastomer or similar product. The retainer ring is installed into the circular restraining ring which together, as an assembly, are then slipped into the socket end of a second pipe and secured by a snap ring. Then the spigot end of a first pipe is inserted into the socket end of the second pipe and ring assembly. This operation does not require that any ring be welded to the outer surface of the first pipe.

In the second embodiment of the present invention, a circular restraining ring and a circular gasket support ring are bolted to a flange of a socket end of a second pipe or fitting. The circular restraining ring includes an inclined inner surface which bears against the locking segment groove ring of a circular retainer ring. A threaded bolt or similar fastener when tightened forces the upper surface of the locking segment groove ring into engagement with the circular restraining ring thereby forcing gripping elements into contact with the outer surface of the spigot end of a first pipe being held in engagement with the socket end of the second pipe.

BRIEF DESCRIPTION OF THE DRAWINGS

FIG. 7 is a perspective view of an embodiment of a retaining ring of the pipe joint of the present invention.

DESCRIPTION OF THE PREFERRED EMBODIMENTS

Figure 1:
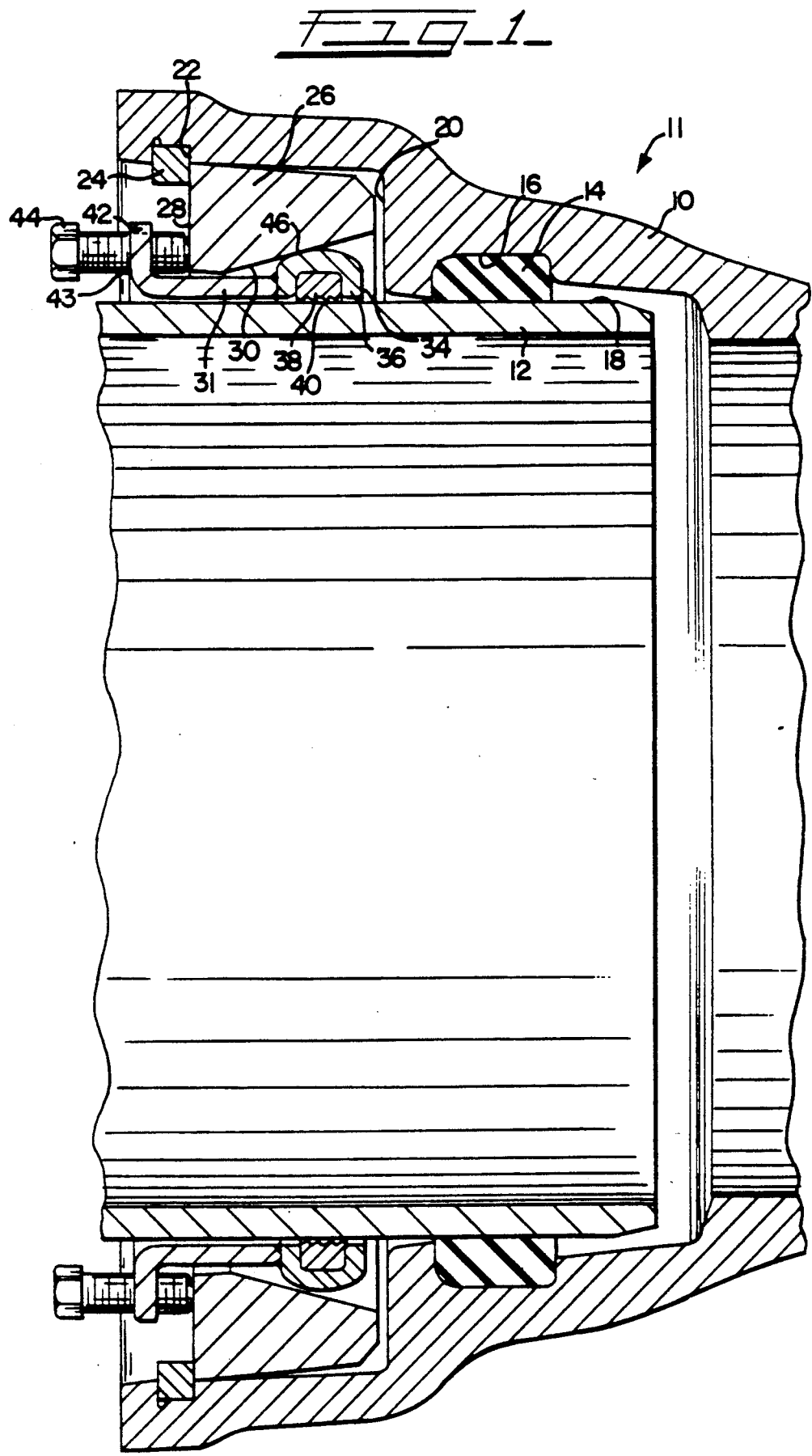
FIG. 1 is a side cross-sectional view of a first embodiment of a restrained push joint in accordance with the present invention.
Figure 2:
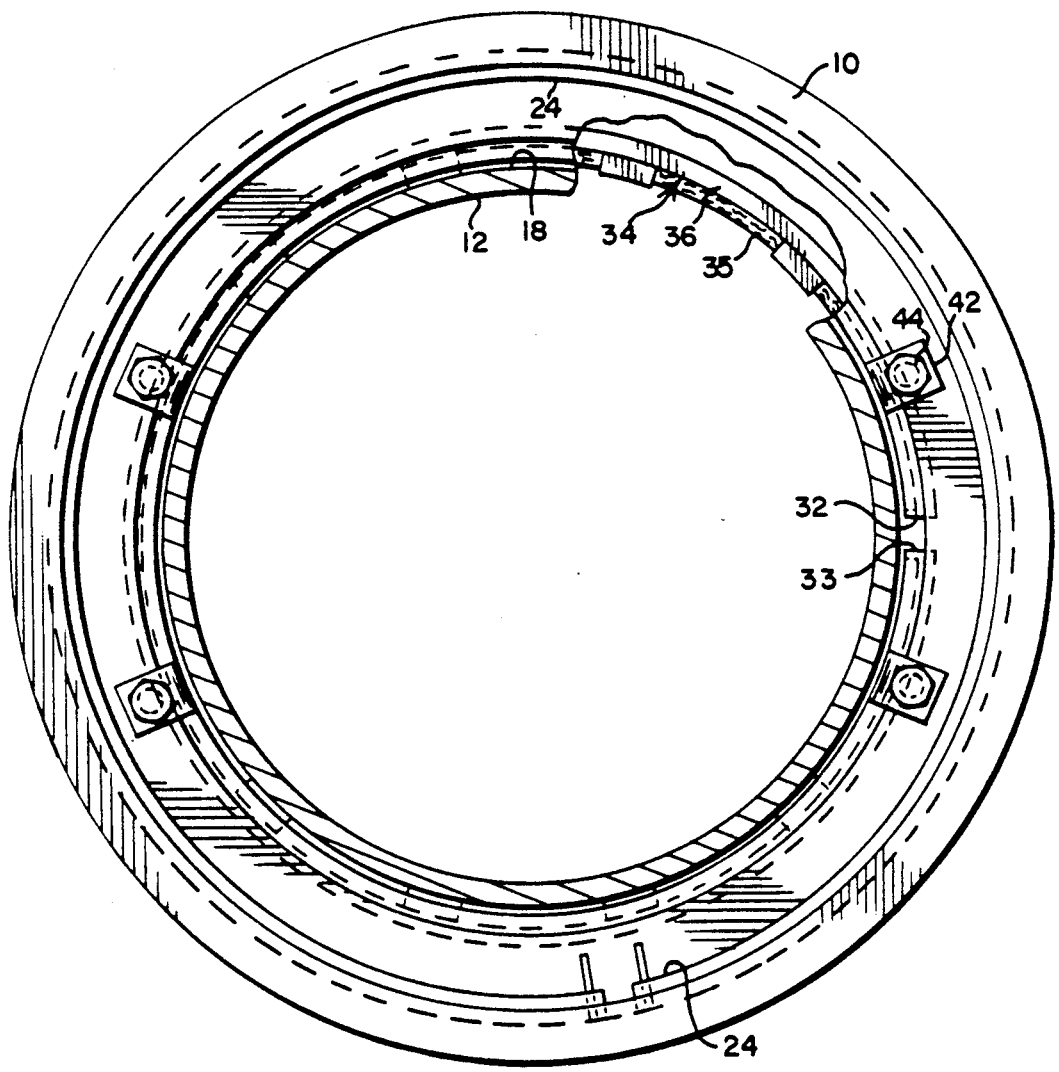
FIG. 2 is a cross-sectional end view of the first embodiment of the restrained push joint in accordance with the present invention.

Referring now to FIGS. 1 and 2 of the drawings, a restrained push joint is shown generally at 11. Spigot end 12 of a first ductile iron pipe is received into the socket end 10 of a second ductile iron pipe. Socket end 10 includes a circular indentation 16 into which gasket 14 is fit such that a liquid tight connection is made with the outer surface 18 of first pipe 12 and with circular indentation 16 of socket end 10 of the second pipe. Socket end 10 includes an inwardly extending circular wall 20 which forms a circular cutout section in the inner surface of socket end 10. A rectangular cutout opening 22 also extends around the entire inner surface of socket end 10. A snap ring 24 is expanded by spring-like action to self hold within opening 22.

A circular restraining ring 26 is fit in the cutout section of socket end 10 and is held in place by having its generally flat front face 28 adjacent to snap ring 24. Restraining ring 26 also includes an inclined inner surface 30.

Retainer ring 34 is comprised of a locking segment groove ring 36, and a series of locking segments 38 separated by spacer elements 35 held within locking segment groove ring 36. It is also possible to fasten locking segment 38 into locking segment groove ring 36 and thereby eliminate the need for spacer elements 35. Retainer ring 34 extends for slightly less than a 360 degree arc, having a spacing between its ends 32 and 33. This spacing allows retainer ring 34 to be closed slightly in circumference. Locking segments 38 are made of steel, whereas spacer elements 35 are usually an elastomer such as rubber or a suitable plastic. Retainer ring 34 also includes three or more metal clamp sections 31. Clamp section 31 is also comprised of an upturned section 42, each having a threaded opening 43. Clamp sections 31 are welded or, otherwise fastened to locking segment groove ring 36 which is a channel shaped member having an inner annular opening into which locking segments 38 are received. Locking segments 38 include protruding teeth 40 which engage outer surface 18 of first pipe 12. It is also possible to provide a retainer ring as two rings of slightly less than a 180 degree arc, each with two or more clamp sections.

A threaded bolt or similar threaded fastener 44 extends through opening 43 in upturned section 42 and abuts flat front surface 28 of circular restraining ring 26.

Upon tightening of threaded bolt 44 against front face 28 of circular restraining ring 26, the outer or top surface 46 of locking segment groove ring 36 contacts the inclined inner surface 30 of circular restraining ring 26. Top surface 46 is usually convex. This action forces teeth 40 of locking segments 38 against and into a secure abutment with outer surface 18 of spigot end 12 of the first pipe.

Figure 5:
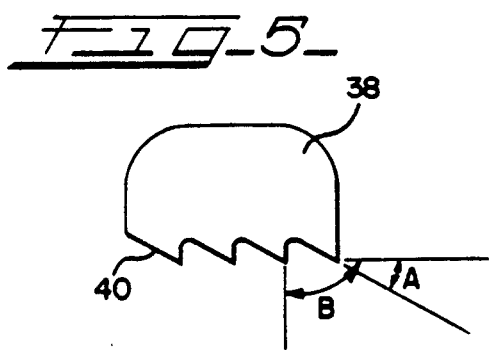
FIG. 5 is a side view of a locking segment of the present invention.
Figure 6:
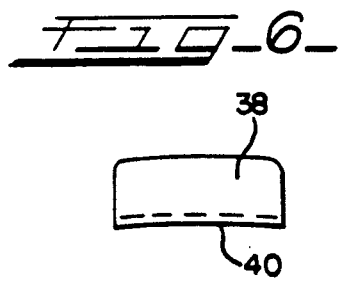
FIG. 6 is an end view of a locking segment of the present invention.

Note that threaded fastener 44 and upturned section 42 of clamp section 31 are present at sufficient locations about locking segment groove ring 36 in order to provide the necessary force to push teeth 40 of locking segment 38 into outer surface 18 of first pipe 12. Generally, three or four upturned sections per joint are adequate. Locking segments 38 is preferably a hardened steel or stainless steel. One preferred embodiment is a type 431 stainless steel with a hardness of R49 (plus or minus four) Rockwell C. It is also preferred if the teeth 40 are formed by angles extending from the horizontal from 20 to 30 degrees A preferred angle is 26¼ degrees. The other cutout section forming teeth 40 is perpendicular to the horizontal. Detailed views of locking segment 38 are provided in FIGS. 5 and 6.

Referring to FIGS. 1 and 2, a typical assembly of a pipe joint in accordance with this embodiment of the present invention will now be explained. Circular indentation 16 is lubricated with a standard pipe lubricant. Gasket 14 is inserted into circular indentation 16 of the socket end 10 of the second pipe. Retainer ring 34 and circular restraining ring 26 are inserted into the circular cutout section of socket end 10 such that circular restraining ring 26 abuts circular wall 20. Snap ring 24 is installed into rectangular cutout opening 22. Threaded fasteners 44 are backed off and locking segment groove ring 36 is pushed back into socket until it abuts circular wall 20.

Lubrication is applied to exposed surface of gasket 14 and spigot end 18 of first pipe to facilitate assembly. Spigot end 18 of first pipe is inserted past gasket 14 until it nears the back of socket. The desired joint deflection is set. Threaded fasteners 44 are then alternately tightened to specified torque to engage teeth 40 of locking segment 38 into contact with spigot surface 18.

As the fluid pressure is applied inside the pipe, the resultant separating force will cause locking segment 38 to further grip into pipe spigot end 18 due to the angle of inclined inner surface 20. Threaded fasteners 44 will no longer be in contact with surface 28 of circular restraining ring 26 when the joint is loaded in this manner.

One advantage of this joint is that it can be deflected without sacrificing gasket tightness as the gasket is tightened prior to engaging gripping teeth. The joint also allows for subsequent joint movement as may be experienced with earth settlement without sacrificing joint tightness.

Referring now to FIG. 7, a perspective view of retainer ring 34 is provided. Locking segment groove ring 36 is shown as comprising a channel shaped member receiving locking segments 38 in an inner annular opening. Clamp sections 31 protrude from locking segment groove ring 36.

Figure 3:
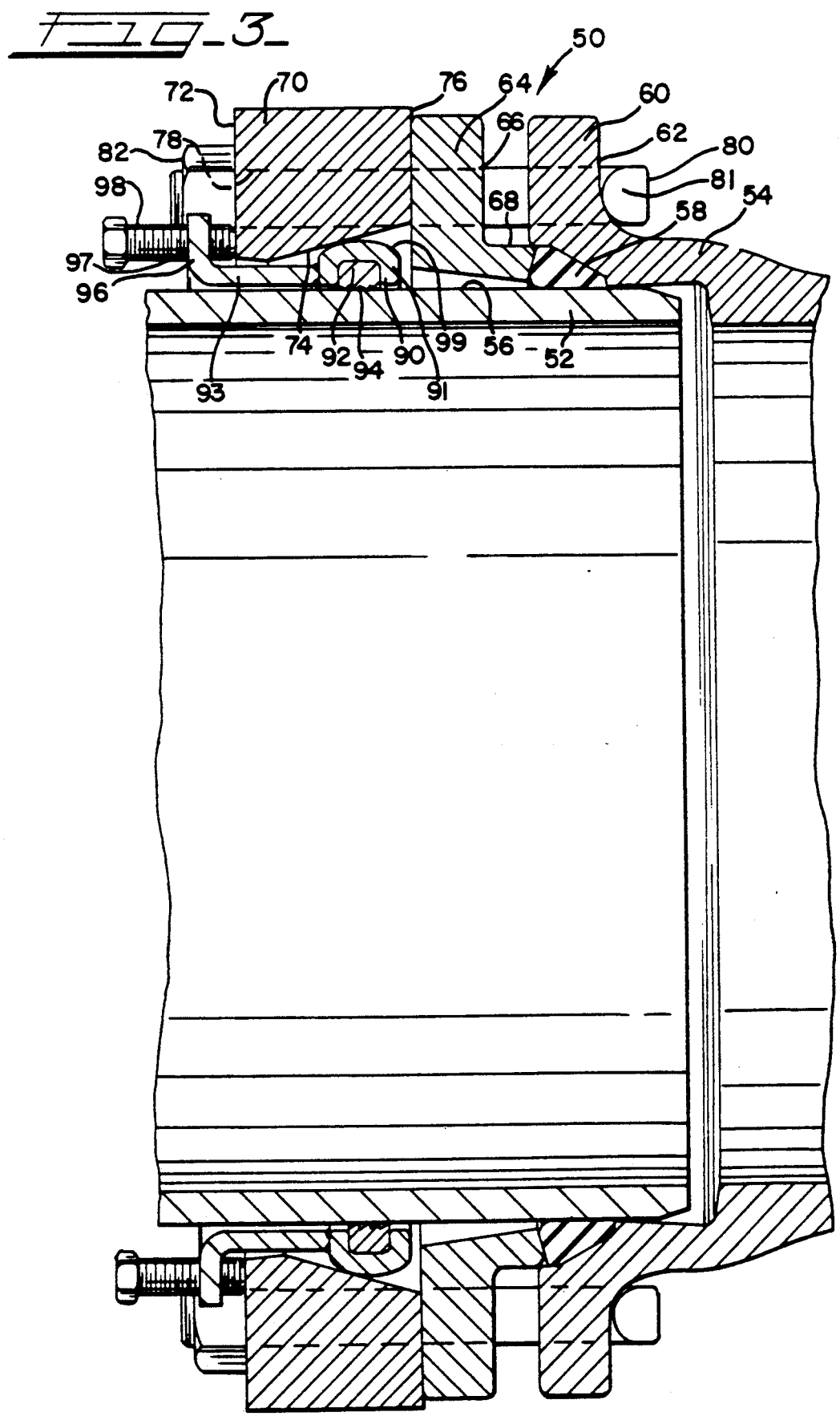
FIG. 3 is a side cross-sectional view of a second embodiment of a restrained mechanical joint in accordance with the present invention.
Figure 4:
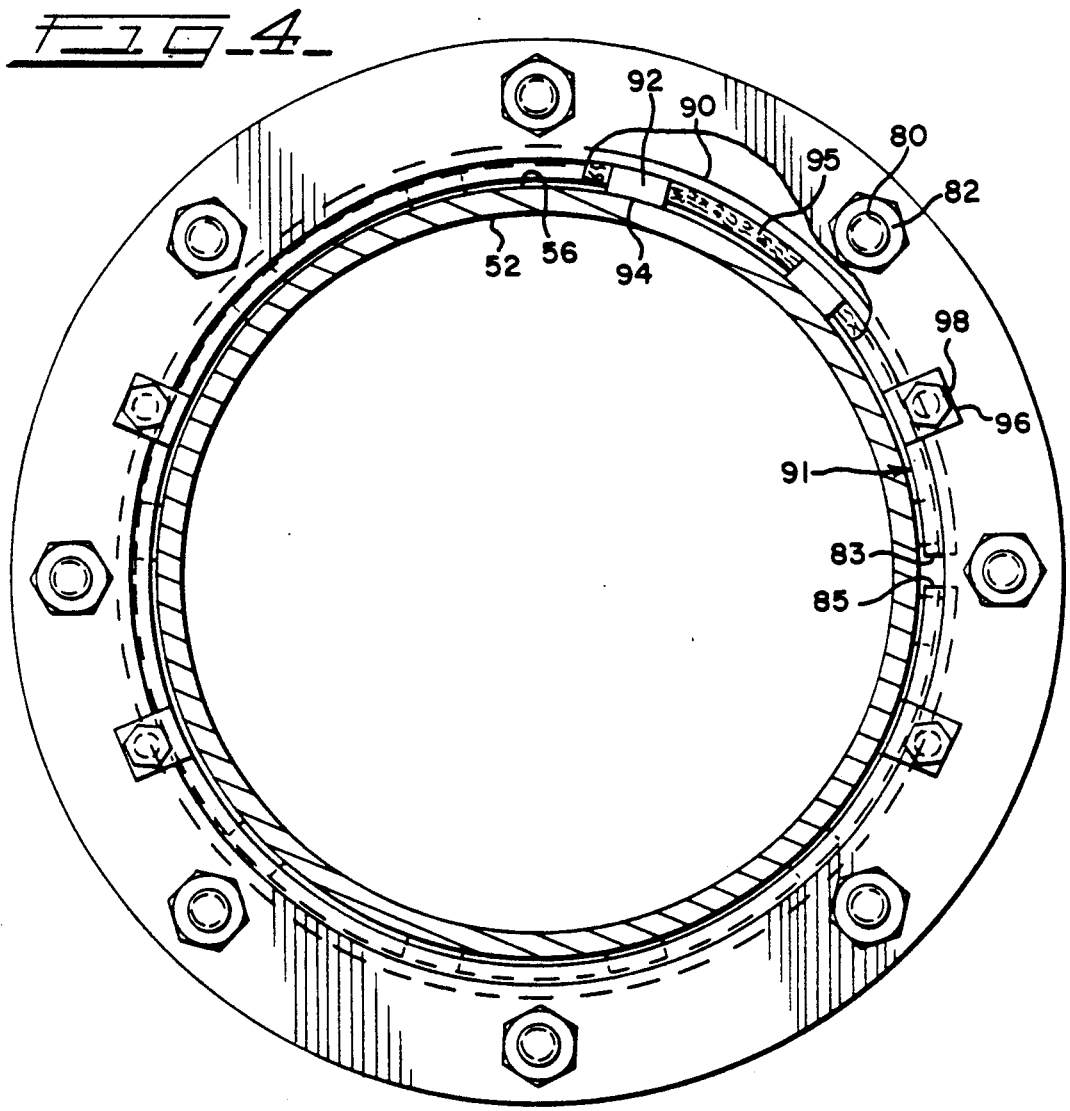
FIG. 4 is an end cross-sectional view of the second embodiment of the restrained mechanical joint in accordance with the present invention.

Referring now to FIGS. 3 and 4, a second embodiment of the present invention is shown generally at 50 as a restrained mechanical pipe joint with a bolt locking arrangement. The spigot end 52 of a first ductile iron pipe extends into the socket end 54 of a second ductile iron pipe. Socket end 54 includes a rim section into which gasket 58 is fitted. Socket end 54 also includes a laterally extending flange 60 having bolt holes 62 therein.

A circular gasket support ring 64 is adjacent to flange 60 of socket end 54 and includes bolt openings 66 there through. Gasket support ring 64 also includes an extended inner section 68 which abuts gasket 58 around its entire circumference. Circular restraining ring 70 is of a generally square or rectangular cross-section with a flat front surface 72, flat rear surface 76 but an inclined inner surface 74. Circular restraining ring 70 also includes bolt hole openings 78.

Bolt 80 has a T-type head 81 which fits against the rear surface of flange 60 of second pipe 54. Bolt 80 extends through bolt hole openings 62 in the socket end 54 of the second pipe, bolt hole opening 66 in gasket support ring 64 and bolt hole opening 78 in circular restraining ring 70. Nut 82 is threaded on the end of bolt 80 such that nut 82 forces against flat front surface 72 of circular restraining ring 70. By tightening nut 82, circular restraining ring 70 is forced against gasket support ring 64 and also pulls against extending flange 60 of second pipe 54. Accordingly, inner flange 68 of gasket support ring 64 butts against and compresses gasket 58 to form a seal between the rim section of the socket end of second pipe 54 and the outer surface 56 of first pipe 52. Sufficient bolts 80 are provided about the circumference of restraining ring 70 to assure the adequate strength coupling of circular restraining ring 70 and gasket support ring 64 to socket end of second pipe 54. For example, for a six inch diameter pipe, six such bolts are adequate, and for a 24 inch diameter pipe, sixteen such bolts are adequate.

Retainer ring 91 is comprised of a locking segment groove ring 90 and a series of locking segments 92 separated by spacer elements 95 held within locking segment groove ring 90. It is also possible to fasten locking segments 92 into locking segment groove ring 90 and thereby eliminate the need for spacer elements 95. Retainer ring 91 extends for slightly less than a 360 degree arc, having a spacing between its ends 83 and 85. This spacing allows retainer ring 91 to be closed slightly in circumference. Locking segments 92 are made of steel, whereas spacer elements 95 are usually an elastomer such as rubber or a suitable plastic. Retainer ring 91 also includes three or more metal clamp sections 93. Each clamp section 93 is also comprised of an upturned section 96, each having a threaded opening 97. Clamp sections 93 are welded or otherwise fastened to locking segment groove ring 90 which is a channel shaped member having an inner annular opening into which locking segments 92 are received. Locking segments 92 includes protruding teeth 94 which engage outer surface 56 of spigot end 52 of first pipe. It is also possible to provide a retainer ring as two rings of slightly less than 180 degree arc, each with two or more clamp sections.

A threaded bolt or similar threaded fastener 98 extends through opening 97 in upturned section 96 and abuts flat front surface 72 of circular restraining ring 70.

Upon tightening of threaded bolt 98 against front face 72 of circular restraining ring 70, the outer or top surface 99 of locking segment groove ring 90 contacts the inclined inner surface 74 of circular restraining ring 70. Top surface 99 is usually convex. This action forces teeth 94 of locking segment 92 against and into a secure abutment with outer surface 56 of spigot end 52 of the first pipe.

Note that threaded fastener 98 and upturned section 96 are present at sufficient locations about locking segment groove ring 90 in order to provide the necessary force to push teeth 94 of locking segment 92 into outer surface 56 of first pipe 52. Generally, three or four upturned sections per joint are adequate. Locking segment 92 is preferably a hardened steel or stainless steel of a type as previously described.

Referring to FIGS. 3 and 4, a typical assembly of a pipe joint in accordance with this embodiment of the present invention will now be explained. Threaded fasteners 98 of retainer ring 91 are backed off to allow clearance between inclined inner surface 74 and top surface 99 of locking segment groove ring 90. Slide retainer ring 91 and circular restraining ring 70 onto spigot end 52 of first pipe. Slide circular gasket support ring 64 onto spigot end 52, adjacent to retainer ring 91. Slide gasket 58 onto spigot end 52, adjacent to circular gasket support ring 64 and brush-coat with lubricant. Insert spigot end 52 of first pipe into socket end 54 of second pipe until spigot nears back of socket. Push gasket 58 into recess, assuring even seating. Slide gasket support ring 64 and retainer ring assembly 91 into position. Install bolts 80 and tighten nuts 82 until hand tight. Locking segment groove ring 90 should abut front surface of gasket support ring 64 for proper assembly. Set the joint deflection and alternately tighten the bolts 80 to specified torque to tighten gasket. Tighten threaded fasteners 98 to engage teeth 94 of locking segment 92 into contact with outer surface 56 of spigot end 52.

As the fluid pressure is applied inside the pipe, the resultant separating force will cause locking segments 92 to further grip into outer surface 56 of first pipe spigot end 56 due to the angle of inclined inner surface 74. Threaded fasteners 98 will no longer be in contact with surface 72 of circular restraining ring 70 when the joint is loaded in this manner.

This restrained joint works well with all standard mechanical joint bells. This joint also allows the joint to be deflected without sacrificing gasket tightness as gasket is tightened prior to engaging gripping teeth. This joint allows for subsequent joint movement as may be experienced with earth settlement without sacrificing joint tightness.

What is claimed is:

1. A pipe joint for joining a spigot end of a first pipe to a socket end of a second pipe, said socket end of said second pipe including a circular flange extending laterally inwardly, and a circular cutout section extending about the inside surface of said socket end, said pipe joint comprising a circular restraining ring having a generally flat front surface and an inclined inner surface, said circular restraining ring positioned within said socket end of said second pipe adjacent said circular flange, said inclined inner surface of said circular restraining ring having increasing diameter toward said socket end of said second pipe, a circular snap ring received in said circular cutout section of said socket end of said second pipe, with a portion of said circular snap ring extending radially inwardly to abut a portion of the flat front surface of the circular restraining ring and thereby secure said circular restraining ring within said socket end of said second pipe, and a retainer ring assembly adjacent an outer surface of said first pipe, comprising a groove ring having an open side facing radially inwardly and a plurality of locking segments within said open side, each of said locking segments having radially inwardly protruding teeth, said groove ring also having a convex top surface and means to urge said convex top surface into engagement with said inclined inner surface of said circular restraining ring whereby said teeth are urged into engagement with said first pipe.

2. The pipe joint of claim 1 further including spacer elements separating said locking segments, said spacer elements comprising elastomer sections that join a plurality of locking sections to form an arcuate assembly within said groove ring.

3. The pipe joint of claim 1 wherein said means to urge includes sections protruding from said groove ring, each of said clamp sections having a threaded opening, and a threaded means extending through said threaded opening in said clamp section, said threaded means contacting said circular restraining ring to force the convex top surface of said groove ring against the inclined inner surface of said circular restraining ring.

4. The pipe joint of claim 3 wherein said threaded means extends through said threaded opening in said clamp section such that, upon turning said threaded means, an end of said threaded means is moved into contact with said circular restraining ring.

5. A pipe joint for joining a spigot end of a first pipe to a socket end of a second pipe, said socket end of said second pipe including a laterally extending flange having a plurality of bolt holes, said pipe joint comprising a gasket support ring including a laterally extending flange having a plurality of bolt holes, said gasket support ring adjacent said socket end flange, a circular restraining ring having generally flat front and rear surfaces and an inclined inner surface, said inclined inner surface of said circular restraining ring having increasing diameter toward said socket end of said second pipe, said circular restraining ring positioned with the rear surface thereof contacting a front surface of the gasket support ring flange, said circular restraining ring having a plurality of bolt holes.

a plurality of bolts, each of which extend through aligned bolt holes in said second pipe flange, said gasket support ring flange and said circular restraining ring, and a retainer ring assembly adjacent an outer surface of said first pipe comprising a groove ring having an open side facing radially inwardly and a plurality of locking segments within said open side, each of said locking segments having radially inwardly protruding teeth, said groove ring also having a convex top surface which engages the inclined inner surface of said circular restraining ring, and further including clamp sections protruding from said groove ring, each of said clamp sections having a threaded opening, and a threaded means extending through said threaded opening in said clamp section, said threaded means contacting said circular restraining ring to force the convex top surface of said groove ring against the inclined inner surface of said circular restraining ring whereby said teeth are urged into engagement with said first pipe.

6. The pipe joint of claim 5 further including spacer elements separating said locking segments, said spacer elements comprising elastomer sections that join a plurality of locking segments to form an arcuate assembly installed within said groove ring.

7. The pipe joint of claim 5 wherein said threaded means extends through said threaded opening in said clamp section such that, upon turning said threaded means, an end of said threaded means is moved into contact with said circular restraining ring.

8. A method of assembling a mechanical pipe joint for joining a spigot end of a first pipe to a socket end of a second pipe comprising the steps of,
providing the socket end of said second pipe with a circular flange extending laterally inwardly, and with a circular cutout section extending about the inside surface of said socket end,
providing a circular restraining ring having a generally flat front surface and an inclined inner surface,
positioning said circular restraining ring within said socket end of said second pipe adjacent said circular flange, said inclined inner surface of said circular restraining ring having increasing diameter toward said socket end of said second pipe,
placing a retainer ring assembly within said circular restraining ring, said retainer ring assembly comprising a groove ring having an open side facing radially inwardly and a plurality of locking segments within said open side,
each of said locking segments including radially inwardly protruding teeth,
placing a circular snap ring in said circular cutout section of said socket end of said second pipe, with a portion of said circular snap ring extending radially inwardly to abut a portion of the flat front surface of the circular restraining ring and thereby secure said circular restraining ring within said socket end of said second pipe,
placing the spigot end of said first pipe into said socket end of said second pipe and into said retainer ring assembly,
and engaging a convex top surface of said groove ring with the inclined inner surface of said circular restraining ring to force the protruding teeth of said securing section into engagement with the outer surface of said first pipe.

* * * * *